(12) United States Patent
Ozai et al.

(10) Patent No.: US 6,699,918 B2
(45) Date of Patent: Mar. 2, 2004

(54) ORGANOPOLYSILOXANE COMPOSITION

(75) Inventors: Toshiyuki Ozai, Takasaki (JP);
Tomoyuki Goto, Annaka (JP);
Yoshifumi Inoue, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 165 days.

(21) Appl. No.: 10/067,374

(22) Filed: Feb. 7, 2002

(65) Prior Publication Data

US 2002/0151616 A1 Oct. 17, 2002

(30) Foreign Application Priority Data

Feb. 7, 2001 (JP) .................................. 2001-031543

(51) Int. Cl.$^7$ .......................... C08L 83/04; C08G 77/20; C08G 77/04
(52) U.S. Cl. .................. 522/148; 522/172; 528/12; 528/17; 528/18; 528/21; 528/32; 528/33
(58) Field of Search ................... 522/148, 172; 528/32, 33, 12, 17, 18, 21

(56) References Cited

U.S. PATENT DOCUMENTS

| | | | |
|---|---|---|---|
| 4,064,027 A | | 12/1977 | Gant |
| 4,229,548 A | * | 10/1980 | Sattlegger et al. .......... 521/110 |
| 4,306,042 A | * | 12/1981 | Neefe .......................... 522/99 |
| 4,528,081 A | | 7/1985 | Lien et al. |
| 4,675,346 A | | 6/1987 | Lin et al. |
| 4,766,189 A | * | 8/1988 | Tsuetaki et al. ............. 526/245 |
| 4,975,472 A | * | 12/1990 | Motegi et al. ................ 522/33 |
| 5,346,976 A | * | 9/1994 | Ellis et al. ................... 526/279 |
| 5,516,823 A | * | 5/1996 | Gentle et al. ............... 524/264 |
| 6,020,445 A | * | 2/2000 | Vanderlaan et al. ........ 526/279 |
| 6,306,999 B1 | | 10/2001 | Ozai et al. |

FOREIGN PATENT DOCUMENTS

| | | |
|---|---|---|
| EP | 0 610 629 | 8/1994 |
| GB | 1 323 869 | 7/1973 |
| JP | 60-104158 | 6/1985 |

* cited by examiner

Primary Examiner—Susan Berman
(74) Attorney, Agent, or Firm—Oblon, Spivak, McClelland, Maier & Neustadt, P.C.

(57) ABSTRACT

An organopolysiloxane composition is provided including: (A) an organopolysiloxane with hydroxyl groups at both terminals of the molecular chain; (B) an organosilicon compound represented by the general formula shown below:

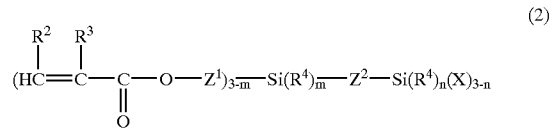

(2)

wherein, $R^2$ represents a hydrogen atom, a phenyl group or a halogenated phenyl group, $R^3$ represents a hydrogen atom or a methyl group, $R^4$ represents a monovalent hydrocarbon group, X represents a hydrolysable group, $Z^1$ represents $-R^5-$, $-R^5O-$ or $-R^5(CH_3)_2SiO-$ (wherein $R^5$ represents a bivalent hydrocarbon group), $Z^2$ represents an oxygen atom or a bivalent hydrocarbon group, m represents 0, 1 or 2, and n represents 0, 1 or 2; (C) a condensation curing catalyst; and (D) a photopolymerization initiator. This composition has two curing mechanisms, namely photopolymerizability and condensation curability, and displays superior adhesiveness, and in particular displays favorable adhesiveness to a substrate immediately following irradiation with ultraviolet light.

11 Claims, No Drawings

ORGANOPOLYSILOXANE COMPOSITION

BACKGROUND OF THE INVENTION

1. Field of the Invention

The present invention relates to an organopolysiloxane composition with two curing mechanisms, namely photopolymerizability and condensation curability.

2. Description of the Prior Art

The curing of an organopolysiloxane by heating in the presence of an organic peroxide, to produce a silicone rubber elastic body with superior heat resistance, low temperature resistance, weather resistance and electrical characteristics, is well known. Furthermore, ultraviolet light curable organopolysiloxane compositions which are cured by irradiation with light in the presence of a photopolymerization initiator are also known, and examples of such compositions are those disclosed in Japanese Post-Examination Publication (kokoku) No. 52-40334 (JP52-40334B) corresponding to U.S. Pat. No. 4,064,027 and Japanese Laid-open Publication (kokai) No. 60-104158 (JP60-104158A), which incorporate a vinyl group containing polysiloxane and a mercapto group containing polysiloxane, and are cured using a light initiated radical addition reaction. However, these compositions have an odor associated with the mercapto group and are corrosive towards metals, and consequently the uses of such compositions are limited.

Furthermore, additional examples of compositions which undergo curing on light irradiation are the compositions disclosed in Japanese Post-Examination Publication (kokoku) No. 53-36515 (JP53-36515B) corresponding to GB 1323869B and Japanese Laid-open Publication (kokai) No. 60-215009 (JP60-215009A), corresponding to U.S. Pat. No. 4,675,346 which comprise an acryloyl group containing polysiloxane, a photopolymerization initiator and a sensitizer. However, in order to obtain a rubber elastic body, these compositions require the use of high molecular weight linear polymers, and so the relative quantity of acryloyl groups located at the terminals becomes extremely small, resulting in a composition of poor curability, and furthermore the surface portions of the composition in contact with the air undergo almost no curing due to the curing inhibiting effect of oxygen. Consequently, only resin-producing compositions with comparatively large quantities of acryloyl groups were able to be developed, and their cured products were unsatisfactory as rubber elastic bodies.

In order to overcome the drawbacks of the acryloyl group containing polysiloxane compositions described above, adhesives with two curing mechanisms, namely curing due to photopolymerization and curing due to atmospheric moisture (condensation curing), have been proposed and developed. A specific example is the composition disclosed in Japanese Post-Examination Publication (kokoku) No. 6-51774 (JP6-51774B) corresponding to U.S. Pat. No. 4,528,081 which incorporates an organopolysiloxane with an acryloyl group or a methacryloyl group and a hydrolysable group at the terminals, a condensation curing catalyst, and a photopolymerization initiator. However, this composition displays poor adhesiveness to a substrate immediately following irradiation with ultraviolet light, and is consequently difficult to use as an ultraviolet curing adhesive.

SUMMARY OF THE INVENTION

In consideration of the circumstances described above, an object of the present invention is to provide an organopolysiloxane composition with two curing mechanisms, namely photopolymerizability and condensation curability, which displays superior adhesiveness, and in particular superior adhesiveness relative to a substrate immediately following irradiation with ultraviolet light.

As a result of intensive investigations of compositions with superior adhesiveness, and in particular superior adhesiveness immediately following irradiation with ultraviolet light, the inventors of the present invention discovered that the reason the composition disclosed in Japanese Post-Examination Publication (kokoku) No. 6-51774 (JP6-51774B) displayed poor adhesiveness relative to a substrate immediately following irradiation with ultraviolet light, was that in one of the curing components of the composition, the part responsible for the photopolymerization, i.e., the acryloyl group or the methacryloyl group, and the part responsible for the condensation curing, i.e., the alkoxy group or the acryloxy group, were bonding together to the same single silicon atom. Consequently in the present invention, the inventors discovered that by using, as one constituent of an organopolysiloxane composition, an organosilicon compound with at least two silicon atoms within a single molecule and with a photopolymerizable group and a condensation curable group bonded to different silicon atoms, the adhesiveness of the composition relative to a substrate immediately following irradiation with ultraviolet light was able to be improved, and as a result were able to complete the present invention.

In other words, the present invention provides an organopolysiloxane composition comprising (A) 100 parts by weight of an organopolysiloxane represented by the general formula (1) shown below

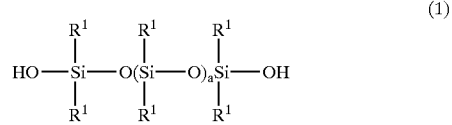

(1)

wherein, each $R^1$ represents, independently, a substituted or unsubstituted monovalent hydrocarbon group of 1 to 15 carbon atoms, and a represents an integer from 10 to 3000; (B) 0.1 to 30 parts by weight of an organosilicon compound represented by the

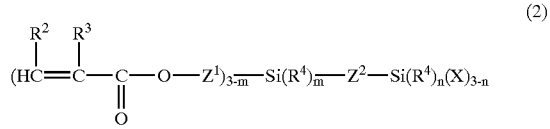

(2)

general formula (2) shown below wherein, each $R^2$ represents, independently, a hydrogen atom, a phenyl group or a halogenated phenyl group, each $R^3$ represents, independently, a hydrogen atom or a methyl group, each $R^4$ represents, independently, a substituted or unsubstituted monovalent hydrocarbon group of 1 to 10 carbon atoms, X represents a hydrolysable group, each $Z^1$ represents, independently, —$R^5$—, —$R^5O$— or —$R^5(CH_3)_2SiO$— where each $R^5$ represents, independently, a substituted or unsubstituted bivalent hydrocarbon group of 1 to 10 carbon atoms, $Z^2$ represents an oxygen atom or a substituted or unsubstituted bivalent hydrocarbon group of 1 to 10 carbon atoms, m represents 0, 1 or 2, and n represents 0, 1 or 2);

(C) an effective quantity of a condensation curing catalyst; and (D) 0.01 to 10 parts by weight of a photopolymerization initiator.

DETAILED DESCRIPTION OF THE PREFERRED EMBODIMENTS

As follows is a more detailed description of an organopolysiloxane composition according to the present invention.

(A) Organopolysiloxane Represented by the General Formula (1)

In the organopolysiloxane represented by the general formula (1), the $R^1$ groups may be the same or different and each group represents a substituted or unsubstituted monovalent hydrocarbon group of 1 to 15 carbon atoms, and preferably 1 to 10 carbon atoms, more preferably 1 to 6 carbon atoms, and a represents an integer from 10 to 3000, and preferably from 50 to 1800.

In the general formula (1), suitable examples of substituted monovalent hydrocarbon groups represented by the symbol $R^1$ include halogenated alkyl groups, e.g., having 1–6 carbon atoms, such as chloromethyl groups, 2-chloroethyl groups, 2-bromoethyl groups, 1,1-dichloropropyl groups, 3-chloropropyl groups and 3,3,3-trifluoropropyl groups; whereas suitable examples of unsubstituted monovalent hydrocarbon groups include alkyl groups, e.g., having 1–6 carbon atoms, such as methyl groups, ethyl groups, propyl groups, isopropyl groups, butyl groups, isobutyl groups, tert-butyl groups, pentyl groups, hexyl groups, and cyclohexyl groups; alkenyl groups, e.g., having 1–6 carbon atoms, such as vinyl groups and allyl groups; aryl groups, e.g., having 6–10 carbon atoms, such as phenyl groups and tolyl groups; and aralkyl groups, e.g., having 7–10 carbon atoms, such as benzyl groups or phenylethyl groups. Of these groups, substituted or unsubstituted alkyl groups of 1 to 6 carbon atoms or phenyl groups are preferred, and methyl groups, ethyl groups, phenyl groups and 3,3,3-trifluoropropyl groups are particularly desirable.

Specific structural examples of organopolysiloxanes represented by the general formula (1) are shown below, although the present invention is in no way limited to the examples shown.

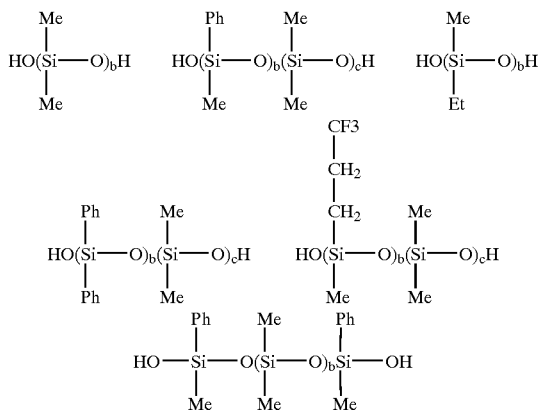

wherein, Me represents a methyl group, Et represents an ethyl group, Ph represents a phenyl group, and b, or b and c, each represent, independently, an integer of 10 to 3000. These compounds may be used singularly, or in combinations of two or more compounds.

(B) Organosilicon Compound Represented by the General Formula (2)

The organosilicon compound represented by the general formula (2) should be used in quantities from 0.1 to 30 parts by weight, and preferably from 1 to 20 parts by weight, and even more preferably from 5 to 20 parts by weight, per 100 parts by weight of the organopolysiloxane represented by the general formula (1).

In the organosilicon compound represented by the general formula (2), each $R^2$ represents a hydrogen atom, a phenyl group or a halogenated phenyl group, each $R^3$ represents a hydrogen atom or a methyl group, and each $R^4$ represents a substituted or unsubstituted monovalent hydrocarbon group of 1 to 10 carbon atoms which may be the same or different. Suitable examples of substituted monovalent hydrocarbon groups represented by the symbol $R^4$ include halogen substituted monovalent hydrocarbon groups such as halogenated alkyl groups including chloromethyl groups, 2-chloroethyl groups, 2-bromoethyl groups, 1,1-dichloropropyl groups, 3-chloropropyl groups and 3,3,3-trifluoropropyl groups, whereas suitable examples of unsubstituted monovalent hydrocarbon groups include alkyl groups such as methyl groups, ethyl groups, propyl groups, isopropyl groups, butyl groups, isobutyl groups, tert-butyl groups, pentyl groups, hexyl groups, cyclohexyl groups, octyl groups and decyl groups; alkenyl groups such as vinyl groups and allyl groups; aryl groups such as phenyl groups and tolyl groups; and aralkyl groups such as benzyl groups or phenylethyl groups. Of these groups, substituted or unsubstituted monovalent hydrocarbon groups of 1 to 3 carbon atoms, such as methyl groups, ethyl groups, propyl groups, isopropyl groups, vinyl groups and allyl groups are preferred.

X represents a hydrolysable group, and examples of preferred groups include lower alkoxy groups and lower alkenyloxy groups of 1 to 6 carbon atoms, or more preferably 1 to 4 carbon atoms, including alkoxy groups as methoxy groups, ethoxy groups, propoxy groups, butoxy groups and methoxyethoxy groups, and alkenyloxy groups such as vinyloxy groups, allyloxy groups, propenoxy groups, isopropenoxy groups and butenyloxy groups. Other suitable groups include ketoxime groups such as dimethyl ketoxime groups and methylethyl ketoxime groups, and acyloxy groups such as acetoxy groups.

$Z^1$ represents —$R^5$—, —$R^5$O— or —$R^5(CH_3)_2SiO$—, wherein the $R^5$ groups may be the same or different, and represent a substituted or unsubstituted bivalent hydrocarbon group of 1 to 10 carbon atoms. Examples of substituted bivalent hydrocarbon groups represented by the symbol $R^5$ include halogen substituted alkylene groups such as chloromethylene groups, dichloromethylene groups and chloroethylene groups, whereas examples of unsubstituted bivalent hydrocarbon groups include alkylene groups such as methylene groups, ethylene groups, propylene groups and tetramethylene groups, or arylene groups such as phenylene groups, and of these groups, substituted or unsubstituted bivalent hydrocarbon groups of 1 to 3 carbon atoms are preferred. $Z^2$ represents an oxygen atom or a substituted or unsubstituted bivalent hydrocarbon group of 1 to 10 carbon atoms, and preferably 1 to 3 carbon atoms. Suitable examples of substituted bivalent hydrocarbon groups represented by the symbol $Z^2$ include the same groups described above in relation to the $R^5$ group, and suitable examples of unsubstituted bivalent hydrocarbon groups also include the same groups described above in relation to the $R^5$ group. Moreover, m represents 0, 1 or 2, and n represents 0, 1 or 2.

Specific structural examples of organosilicon compounds represented by the general formula (2) are shown below, although the present invention is in no way limited to the examples shown.

(a)

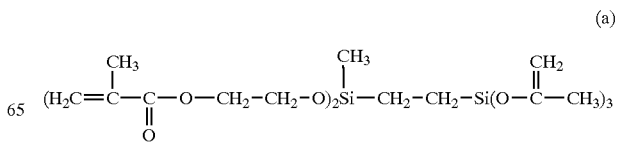

(b)
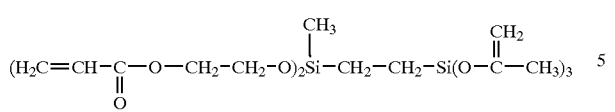

(c)
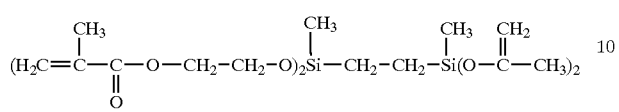

(d)
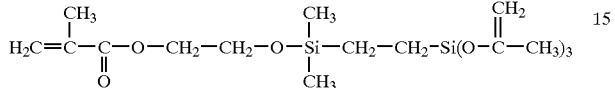

(e)
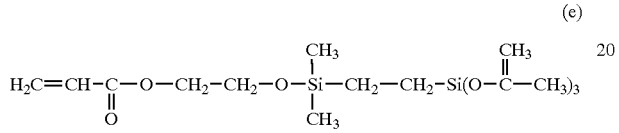

(f)
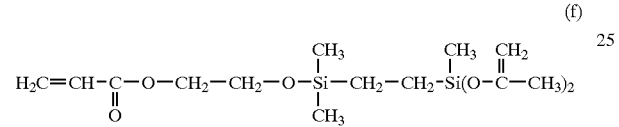

(g)
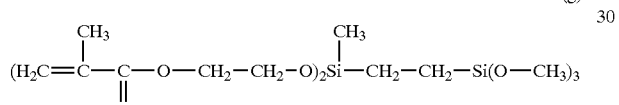

(h)
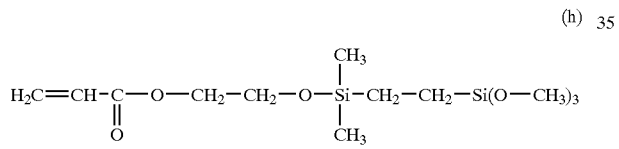

(i)
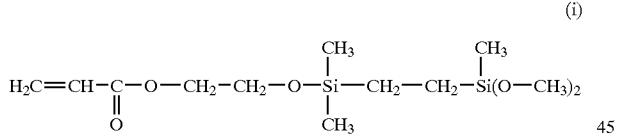

(j)
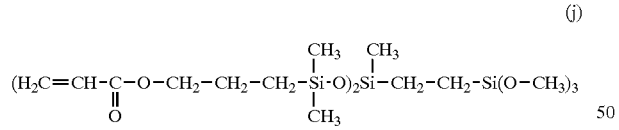

(k)
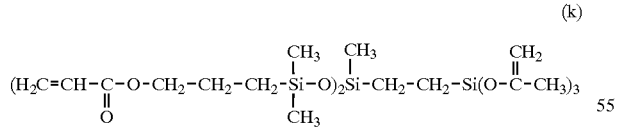

(l)
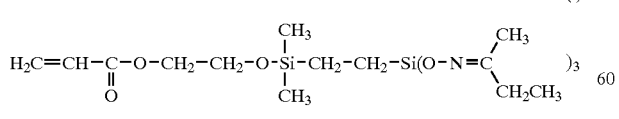

(m)
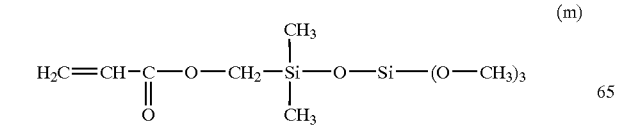

(n)
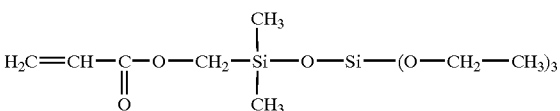

(o)
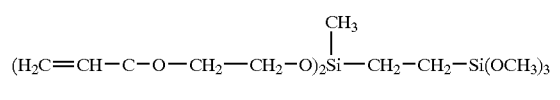

These compounds may be used singularly, or in combinations of two or more compounds.

An organosilicon compound represented by the general formula (2) can be produced in the manner described below.

(a)
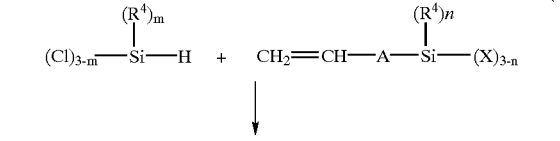

(b)
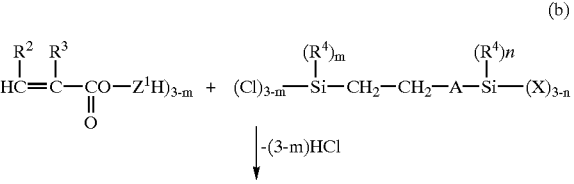

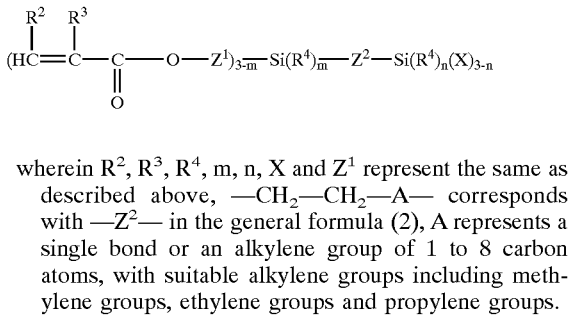

wherein $R^2$, $R^3$, $R^4$, m, n, X and $Z^1$ represent the same as described above, —$CH_2$—$CH_2$—A— corresponds with —$Z^2$— in the general formula (2), A represents a single bond or an alkylene group of 1 to 8 carbon atoms, with suitable alkylene groups including methylene groups, ethylene groups and propylene groups.

Furthermore, an organosilicon compound represented by the general formula (2) can also be produced using the method shown below.

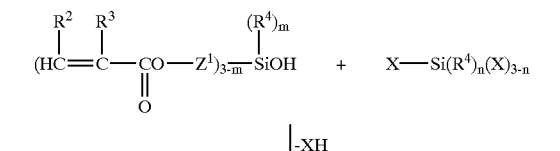

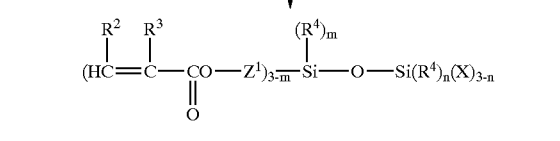

wherein $R^2$, $R^3$, $R^4$, m, n, $Z^1$ and X represent the same as described above.

(C) Condensation Curing Catalyst

The condensation curing catalyst utilizes any typically known condensation curing catalyst, and specific examples of effective materials include organometallic compounds of tin or titanium such as alkyl titanates, organosilicon titanates, and metal carboxylates such as tin octylate and dibutyl tin phthalate; amine salts such as dibutylamine-2-ethylhexoate; as well as other acid catalysts or base catalysts, particularly silanol condensation catalysts such as nitrogen containing compounds with a guanidyl group. In those cases in which the hydrolysable group X of the organosilicon compound represented by the general formula (2) is an alkenoxy group, a nitrogen containing compound with a guanidyl group is particularly desirable. The condensation curing catalyst may utilize a single compound, or a combination of two or more compounds.

The condensation curing catalyst is used in an effective quantity, typically between 0.01 and 10 parts by weight, and preferably from 0.1 to 3 parts by weight, per 100 parts by weight of the organopolysiloxane represented by the general formula (1). At quantities less than 0.01 parts by weight the addition has little effect, whereas at quantities exceeding 10 parts by weight the strength of the produced silicone rubber tends to be poor, and the physical characteristics of the cured product may deteriorate.

(D) Photopolymerization Initiator

Known materials can be used as the photopolymerization initiator, and these materials promote the photopolymerization of (meth)acryloyl groups. Specific examples include acetophenone, propiophenone, benzophenone, xanthone, fluorenone, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl) ketone, benzylmethoxy ketal, 2-chlorothioxanthone, diethylacetophenone, 1-hydroxycyclohexyl phenyl ketone, 2-methyl-(4-(methylthio)phenyl)2-morpholino-1-propane, 2,2-dimethoxy-2-phenylacetophenone and diethoxyacetophenone, and these compounds may be used singularly, or in combinations of two or more compounds.

The quantity of photopolymerization initiator should typically be from 0.01 to 10 parts by weight, and preferably from 0.1 to 3 parts by weight, per 100 parts by weight of the organopolysiloxane represented by the general formula (1). At quantities less than 0.01 parts by weight per 100 parts by weight of the organopolysiloxane represented by the general formula (1) the addition has little effect, whereas at quantities exceeding 10 parts by weight the strength of the produced silicone rubber tends to be poor, and the physical characteristics of the cured product may deteriorate.

Organopolysiloxane Composition

An organopolysiloxane composition of the present invention is obtained by uniformly mixing predetermined quantities of the aforementioned constituents (A) to (D). Furthermore, other additives may also be included in a composition of the present invention, provided such additives do not impair the effects of the present invention. For example, inorganic based fillers which do not inhibit curing by light irradiation may be added to a composition to improve the mechanical properties of the produced silicone rubber elastic body, and moreover thixotropic agents, reagents for improving the heat resistance, coloring agents and adhesion-imparting agents may be added in order to adjust certain properties of a composition.

Uses

A composition of the present invention obtained in the manner described above has two curing mechanisms, namely photopolymerizability and condensation curability, and also incorporates photopolymerizable (meth) acryloxyorganosilyl groups, and so irradiation with ultraviolet light causes the composition to cure easily, and within a short time period of only 1 to 20 seconds, to produce a silicone rubber. Furthermore, a rubber elastic body produced in this manner displays the special characteristics of a silicone rubber such as superior heat resistance, weather resistance and low temperature resistance, and so can be utilized in a wide variety of different fields.

Organopolysiloxane compositions according to the present invention can be utilized in potting or coating for substrates for electrical circuits including, e.g., substrates for vehicle components, substrates for outdoor equipment, various power supply substrates and the like, coating for mobile telephone key pads, and moisture proof adhesives for use around the periphery of liquid crystal displays. Furthermore, the potential uses of these compositions are not limited to those listed here, and also include other uses requiring adhesion, moisture proofing, heat resistance, weather resistance and low temperature resistance.

EXAMPLES

As follows is a description of specifics of the present invention using a series of examples. However, the present invention is in no way limited to the examples presented.

Synthetic Example 1

In a 1 liter 4 neck flask equipped with a coiled condenser and a thermometer were placed 135.6 g (0.6 mol) of vinyltriisopropenoxysilane and 200 g of toluene, and the temperature was raised to 40° C. With the temperature at 40° C., 0.1 g of a 2% solution of chloroplatinic acid in 2-ethylhexanol was added, and 75.9 g (0.66 mol) of dichloromethylsilane was then added dropwise. Following completion of this addition, the reaction was allowed to proceed by refluxing the unreacted dichloromethylsilane at 60 to 70° C. for one hour, and then at 80 to 90° C. for a further two hours. Following this reaction period, gas chromatography was used to confirm the completion of the reaction between the vinyltriisopropenoxysilane and the dichloromethylsilane. The temperature was then cooled to approximately 30° C., and 133.6 g (1.32 mol) of triethylamine and 0.1 g of butylhydroxytoluene were added to the reaction system. 171 g (1.32 mol) of hydroxyethyl methacrylate was then added dropwise. Following completion of this addition, the mixture was aged for three hours at 60° C., and the precipitated triethylamine hydrochloride was then removed by filtration. Following filtration, any unreacted reactants were removed by concentrating the mixture for two hours at 60 to 70° C. and 665 Pa (5 mmHg) to yield 238.1 g of 1-methylbis(2-methacryloxyethoxy)silyl-2-triisopropenoxysilylethane (formula (a), yield 80%).

The above compound was identified by NMR and IR.

NMR: (0.105 ppm, s, 3H, Si—$CH_3$), (0.65 to 0.79 ppm, broad, 4H, —$CH_2$—$CH_2$—), (1.79 ppm, s, 9H, O—C—$CH_3$), (1.90 ppm, s, 6H, =C—$CH_3$), (3.86 to 4.10 ppm, broad, 8H, —O—$CH_2$—$CH_2$—O—), (4.10, 4.26 ppm, d, 6H, O—C=$CH_2$), (5.52, 6.08 ppm, d, 4H, $CH_2$=C)

IR: (2800 to 3000 $cm^{-1}$, $\nu$ CH), (1650 $cm^{-1}$, $\nu$ C=C), (1700 $cm^{-1}$, $\nu$ C=O), (1150 $cm^{-1}$, $\nu$ Si—OC)

Synthetic Example 2

In a 1 liter 4 neck flask equipped with a coiled condenser and a thermometer were placed 88.8 g (0.6 mol) of vinyltrimethoxysilane and 200 g of toluene, and the temperature was raised to 40° C. With the temperature at 40° C., 0.1 g of a 2% solution of chloroplatinic acid in 2-ethylhexanol was added, and 75.9 g (0.66 mol) of dichloromethylsilane was then added dropwise. Following completion of this addition, the reaction was allowed to proceed by refluxing the unreacted dichloromethylsilane at 60 to 70° C. for one hour, and then at 80 to 90° C. for a further two hours. Following this reaction period, gas chromatography was used to confirm the completion of the reaction between the vinyltrimethoxysilane and the dichloromethylsilane. The temperature was then cooled to approximately 30° C., and 133.6 g (1.32 mol) of triethylamine and 0.1 g of butylhydroxytoluene were added to the reaction system. 171 g (1.32 mol) of hydroxyethyl methacrylate was then added dropwise. Following completion of this addition, the mixture was aged for three hours at 60° C., and the precipitated triethylamine hydrochloride was then removed by filtration. Following filtration, any unreacted reactants were removed by concentrating the mixture for two hours at 60 to 70° C. and 665 Pa (5 mmHg) to yield 221 g of 1-methylbis(2-methacryloxyethoxy)silyl-2-trimethoxysilylethane (formula (g), yield 84%).

The above compound was identified by NMR and IR.

NMR: (0.105 ppm, s, 3H, Si—$CH_3$), (0.65 to 0.79 ppm, broad, 4H, —$CH_2$—$CH_2$—), (1.90 ppm, s, 6H, =C—$CH_3$), (3.86 to 4.10 ppm, broad, 8H, —O—$CH_2$—$CH_2$—O—), (3.3 ppm, s, 9H, O—$CH_3$), (5.52, 6.08 ppm, d, 4H, $CH_2$=C)

IR: (2800 to 3000 $cm^{-1}$, $^\nu$ CH), (1650 $cm^{-1}$, $^\nu$ C=C), (1700 $cm^{-1}$, $^\nu$ C=O), (1150 $cm^{-1}$, $^\nu$ Si—OC)

Synthetic Example 3

In a 1 liter 4 neck flask equipped with a coiled condenser and a thermometer were placed 88.8 g (0.6 mol) of vinyltrimethoxysilane and 200 g of toluene, and the temperature was raised to 40° C. With the temperature at 40° C., 0.1 g of a 2% solution of chloroplatinic acid in 2-ethylhexanol was added, and 75.9 g (0.66 mol) of dichloromethylsilane was then added dropwise. Following completion of this addition, the reaction was allowed to proceed by refluxing the unreacted dichloromethylsilane at 60 to 70° C. for one hour, and then at 80 to 90° C. for a further two hours. Following this reaction period, gas chromatography was used to confirm the completion of the reaction between the vinyltrimethoxysilane and the dichloromethylsilane. The temperature was then cooled to approximately 30° C., and 133.6 g (1.32 mol) of triethylamine and 0.1 g of butylhydroxytoluene were added to the reaction system. 153 g (1.32 mol) of hydroxyethyl acrylate was then added dropwise. Following completion of this addition, the mixture was aged for three hours at 60° C., and the precipitated triethylamine hydrochloride was then removed by filtration. Following filtration, any unreacted reactants were removed by concentrating the mixture for two hours at 60 to 70° C. and 665 Pa (5 mmHg) to yield 209 g of 1-methylbis(2-acryloxyethoxy)silyl-2-trimethoxysilylethane (formula (o), yield 84%).

The above compound was identified by NMR and IR.

NMR: (0.105 ppm, s, 3H, Si—$CH_3$), (0.65 to 0.79 ppm, broad, 4H, —$CH_2$—$CH_2$—), (1.90 ppm, t, 2H, C=CH), (3.86 to 4.10 ppm, broad, 8H, —O—$CH_2$—$CH_2$—O—), (3.3 ppm, s, 9H, O—$CH_3$), (5.52, 6.08 ppm, d, 4H, $CH_2$=C)

IR: (2800 to 3000 $cm^{-1}$, $^\nu$ CH), (1650 $cm^{-1}$, $^\nu$ C=C), (1700 $cm^{-1}$, $^\nu$ C=O), (1150 $cm^{-1}$, $^\nu$ Si—OC)

Synthetic Example 4

In a 1 liter 4 neck flask equipped with a coiled condenser and a thermometer were placed 135.6 g (0.6 mol) of vinyltriisopropenoxysilane and 200 g of toluene, and the temperature was raised to 40° C. With the temperature at 40° C., 0.1 g of a 2% solution of chloroplatinic acid in 2-ethylhexanol was added, and 61.7 g (0.66 mol) of dimethylchlorosilane was then added dropwise. Following completion of this addition, the reaction was allowed to proceed by refluxing the unreacted dimethylchlorosilane at 60 to 70° C. for one hour, and then at 80 to 90° C. for a further two hours. Following this reaction period, gas chromatography was used to confirm the completion of the reaction between the vinyltriisopropenoxysilane and the dimethylchlorosilane. The temperature was then cooled to approximately 30° C., and 133.6 g (1.32 mol) of triethylamine and 0.1 g of butylhydroxytoluene were added to the reaction system. 85.4 g (0.66 mol) of hydroxyethyl methacrylate was then added dropwise. Following completion of this addition, the mixture was aged for three hours at 60° C., and the precipitated triethylamine hydrochloride was then removed by filtration. Following filtration, any unreacted reactants were removed by concentrating the mixture for two hours at 60 to 70° C. and 665 Pa (5 mmHg) to yield 206 g of 1-dimethyl(2-methacryloxyethoxy)silyl-2-triisopropenoxysilylethane (formula (d), yield 80%).

The above compound was identified by NMR and IR.

NMR: (0.105 ppm, s, 6H, Si—$CH_3$), (0.65 to 0.79 ppm, broad, 4H, —$CH_2$—$CH_2$—), (1.80 ppm, s, 3H, C—$CH_3$), (1.90 ppm, s, 9H, =C—$CH_3$), (3.86 to 4.10 ppm, broad, 4H, —O—$CH_2$—$CH_2$—O—), (4.0, 4.25 ppm, d, 6H, O—C=$CH_2$), (5.45, 6.1 ppm, d, 2H, $CH_2$=C)

IR: (2800 to 3000 $cm^{-1}$, $^\nu$ CH), (1650 $cm^{-1}$, $^\nu$ C=C), (1700 $cm^{-1}$, $^\nu$ C=O), (1150 $cm^{-1}$, $^\nu$ Si—OC)

Synthetic Example 5

In a 1 liter 4 neck flask equipped with a coiled condenser and a thermometer were placed 152 g (1.0 mol) of tetramethoxysilane and 1 g of tin dioctoate, and the temperature was raised to 80° C. With the temperature at 80° C., 160 g (1.0 mol) of acryloxymethyldimethylsilanol was then added dropwise. Following completion of this addition, the mixture was aged for two hours at 80° C. Following aging, a vacuum distillation was performed at 92° C. and 399 Pa (3 mmHg) to yield 182 g of acryloxymethyldimethylsiloxytrimethoxysilane (formula (m), yield 65%).

Examples 1 to 9, Comparative Examples 1 to 5

In each of these examples and comparative examples, an organopolysiloxane composition was prepared by combining the constituents shown in Table 1, Table 4 and Table 7 to generate a uniform mixture. The various physical properties of each composition were then measured. The results are shown in Table 1 through Table 7. In the tables, the units for the figures for each of the composition constituents are parts by weight, the tack free time was measured by a touch test, and the elongation and tensile strength values were measured in accordance with JIS K-6251. The adhesiveness was measured by applying each composition to a series of substrates comprising either an acrylic resin (Acrylite 001, manufactured by Mitsubishi Plastics (Inc.)), a glass epoxy resin (KEL-GEF, manufactured by Shin-Kobe Electric Machinery Co. (Ltd.)) or aluminum (JIS-H4000), curing the composition under the various curing conditions shown in the tables to generate a cured rubber layer approximately 1 mm thick, and then scratching the surface of the rubber layer with a fingernail. The adhesive state following the scratching was evaluated as shown below.

○: Favorable adhesion, Δ: partial adhesion, X: completely peeled away

TABLE 1

| Example | 1 | 2 | 3 | 4 | 5 |
|---|---|---|---|---|---|
| α,ω-hydroxypolydimethylsiloxane: molecular weight 16,000 | 100 | 100 | 100 | 100 | 100 |
| 1-methylbis(2-methacryloxyethoxy)silyl-2-triisopropenoxysilylethane (formula (a)) prepared in the synthetic example 1 | 10 | — | — | — | — |
| 1-methylbis(2-methacryloxyethoxy)silyl-2-trimethoxysilylethane (formula (g)) prepared in the synthetic example 2 | — | 10 | — | — | — |
| 1-methylbis(2-acryloxyethoxy)silyl-2-trimethoxysilylethane (formula (o)) prepared in the synthetic example 3 | — | — | 10 | — | — |
| 1-dimethyl(2-methacryloxyethoxy)silyl-2-triisopropenoxysilylethane (formula (d)) prepared in the synthetic example 4 | — | — | — | 8 | — |
| acryloxymethyldimethylsiloxytrimethoxysilane (formula (m)) prepared in the synthetic example 5 | — | — | — | — | 8 |
| diethoxyacetophenone | 2 | 1.5 | 1.7 | 3 | 2 |
| tetramethylguanidylpropyltrimethoxysilane | 1 | — | — | 1 | 1 |
| dibutyl tin methoxide | — | 0.1 | 0.1 | — | — |
| *Physical properties prior to curing* | | | | | |
| viscosity (Pa · s) 23° C. | 2 | 2.2 | 2.5 | 2 | 2.5 |
| tack free time (minutes) | 7 | 30 | 30 | 7 | 30 |
| *Physical properties after curing (curing conditions: 23° C. 55% RH × 1 day)* | | | | | |
| hardness (durometer type A) | 23 | 23 | 23 | 25 | 25 |
| elongation (%) | 120 | 120 | 120 | 110 | 100 |
| tensile strength (MPa) | 0.8 | 0.9 | 0.9 | 0.8 | 0.7 |
| *Adhesiveness* | | | | | |
| acrylic resin | ○ | ○ | ○ | ○ | ○ |
| glass epoxy resin | ○ | ○ | ○ | ○ | ○ |
| aluminum | ○ | ○ | ○ | ○ | ○ |

TABLE 2

| Example | 1 | 2 | 3 | 4 | 5 |
|---|---|---|---|---|---|
| *Physical properties after curing (curing conditions: ultraviolet irradiation (high pressure mercury lamp (100 mW/cm², 365 nm)) × 15 seconds)* | | | | | |
| hardness (durometer type A) | 25 | 25 | 25 | 23 | 23 |
| elongation (%) | 120 | 120 | 120 | 130 | 100 |
| tensile strength (MPa) | 0.7 | 0.9 | 0.6 | 0.8 | 0.7 |
| *Adhesiveness* | | | | | |
| acrylic resin | ○ | ○ | ○ | ○ | ○ |
| glass epoxy resin | ○ | ○ | ○ | ○ | ○ |
| aluminum | ○ | ○ | ○ | ○ | ○ |

TABLE 3

| Example | 1 | 2 | 3 | 4 | 5 |
|---|---|---|---|---|---|
| *Physical properties after curing (curing conditions: ultraviolet irradiation (high pressure mercury lamp (100 mW/cm², 365 nm)) × 15 seconds + 23° C. 55% RH × 1 day)* | | | | | |
| hardness (durometer type A) | 27 | 27 | 27 | 27 | 27 |
| elongation (%) | 120 | 120 | 130 | 130 | 120 |
| tensile strength (MPa) | 0.9 | 0.9 | 1.1 | 0.9 | 1.1 |
| *Adhesiveness* | | | | | |
| acrylic resin | ○ | ○ | ○ | ○ | ○ |
| glass epoxy resin | ○ | ○ | ○ | ○ | ○ |
| aluminum | ○ | ○ | ○ | ○ | ○ |

TABLE 4

| Example | 6 | 7 | 8[*3] | 9[*3] |
|---|---|---|---|---|
| α,ω-hydroxypolydimethylsiloxane: molecular weight 16,000 | 100 | 100 | 100 | 100 |
| Aerosil R-972[*1] manufactured by Nippon Aerosil Co. Ltd | 5 | 5 | — | — |
| Fineseal E-70[*2] manufactured by Tokuyama Corporation | — | — | 5 | 5 |
| 1-methylbis(2-methacryloxyethoxy)silyl-2- | 10 | — | 10 | — |

TABLE 4-continued

| Example | 6 | 7 | 8(*3) | 9(*3) |
|---|---|---|---|---|
| triisopropenoxysilylethane (formula (a)) prepared in the synthetic example 1 | | | | |
| 1-dimethyl(2-methacryloxyethoxy)silyl-2-triisopropenoxysilylethane (formula (d)) prepared in the synthetic example 4 | — | 10 | — | 10 |
| diethoxyacetophenone | 2 | 1.7 | 2 | 2 |
| tetramethylguanidylpropyltrimethoxysilane | 1 | 1 | 1 | 1 |
| dibutyl tin methoxide | — | — | — | — |
| Physical properties prior to curing | | | | |
| viscosity (Pa · s) 23° C. | 30 | 30 | 25 | 25 |
| tack free time (minutes) | 5 | 5 | 7 | 7 |
| Physical properties after curing (curing conditions: 23° C. 55% RH × 1 day) | | | | |
| hardness (durometer type A) | 26 | 27 | 26 | 26 |
| elongation (%) | 150 | 150 | 140 | 160 |
| tensile strength (MPa) | 1.5 | 1.7 | 1.7 | 1.6 |
| Adhesiveness | | | | |
| acrylic resin | ○ | ○ | ○ | ○ |
| glass epoxy resin | ○ | ○ | ○ | ○ |
| aluminum | ○ | ○ | ○ | ○ |

(*1)fumed silica
(*2)precipitated silica
(*3)In Example 8 and Example 9, when the α,ω-hydroxypolydimethylsiloxane was combined with the Fineseal E-70, mixing was carried out for 2 hours at 150° C. using a three-roll mill.

(*3) In Example 8 and Example 9, when the α,ω-hydroxypolydimethylsiloxane was combined with the Fineseal E-70, mixing was carried out for 2 hours at 150° C. using a three-roll mill.

TABLE 5

| Example | 6 | 7 | 8 | 9 |
|---|---|---|---|---|
| Physical properties after curing (curing conditions: ultraviolet irradiation (high pressure mercury lamp (100 mW/cm², 365 nm)) × 15 seconds) | | | | |
| hardness (durometer type A) | 26 | 26 | 26 | 27 |
| elongation (%) | 120 | 120 | 120 | 130 |
| tensile strength (MPa) | 1.2 | 1.4 | 1.4 | 1.5 |
| Adhesiveness | | | | |
| acrylic resin | ○ | ○ | ○ | ○ |
| glass epoxy resin | ○ | ○ | ○ | ○ |
| aluminum | ○ | ○ | ○ | ○ |

TABLE 6

| Example | 6 | 7 | 8 | 9 |
|---|---|---|---|---|
| Physical properties after curing (curing conditions: ultraviolet irradiation (high pressure mercury lamp (100 mW/cm², 365 nm)) × 15 seconds + 23° C. 55% RH × 1 day) | | | | |
| hardness (durometer type A) | 27 | 27 | 27 | 27 |
| elongation (%) | 120 | 120 | 130 | 130 |
| tensile strength (MPa) | 1.8 | 1.9 | 1.8 | 1.8 |
| Adhesiveness | | | | |
| acrylic resin | ○ | ○ | ○ | ○ |
| glass epoxy resin | ○ | ○ | ○ | ○ |
| aluminum | ○ | ○ | ○ | ○ |

TABLE 7

| Comparative Example | 1 | 2 | 3 | 4 | 5 |
|---|---|---|---|---|---|
| α,ω-hydroxypolydimethylsiloxane: molecular weight 16,000 | 100 | 100 | 80 | 100 | — |
| The diorganopolysiloxane with unmodified terminals represented by the formula (P) below | — | — | — | — | 100 |
| Aerosil R-972 manufactured by Nippon Aerosil Co. Ltd | — | — | — | 5 | — |
| acryloxypropyltrimethoxysilane | 7 | — | — | 7 | — |
| methacryloxypropyltrimethoxysilane | — | 7 | — | — | — |
| isobornyl acrylate | — | — | 20 | — | — |
| methyltrimethoxysilane | — | — | 5 | — | 5 |
| diethoxyacetophenone | 2 | 2 | 2 | 2 | 2 |
| dibutyl tin methoxide | — | 0.1 | 0.1 | 0.1 | — |
| titanium tetraisopropoxide | 1.5 | 1.2 | — | — | 1.5 |
| Physical properties prior to curing | | | | | |
| viscosity (Pa · s) 23° C. | 3 | 3 | 4 | 20 | 5 |
| tack free time (minutes) | 30 | 30 | 50 | 7 | 30 |
| Physical properties after curing (curing conditions: 23° C. 55% RH × 1 day) | | | | | |
| hardness (durometer type A) | 5 | 3 | 5 | 10 | 5 |
| elongation (%) | 50 | 50 | 50 | 60 | 50 |
| tensile strength (MPa) | 0.2 | 0.3 | 0.3 | 0.4 | 0.3 |
| Adhesiveness | | | | | |
| acrylic resin | X | X | X | X | X |
| glass epoxy resin | X | X | X | X | X |
| aluminum | X | X | X | X | X |

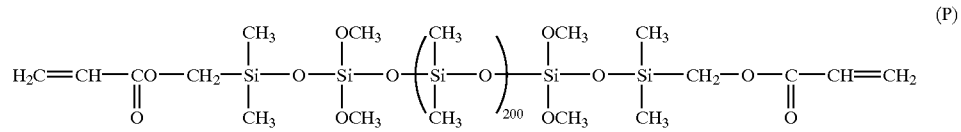

(P)

TABLE 8

| Comparative Example | 1 | 2 | 3 | 4 | 5 |
|---|---|---|---|---|---|
| Physical properties after curing (curing conditions: ultraviolet irradiation (high pressure mercury lamp (100 mW/cm², 365 nm)) × 15 seconds) | | | | | |
| hardness (durometer type A) | 23 | 25 | 25 | 27 | 23 |
| elongation (%) | 120 | 120 | 120 | 130 | 110 |
| tensile strength (MPa) | 0.7 | 0.9 | 0.6 | 0.8 | 0.7 |
| Adhesiveness | | | | | |
| acrylic resin | X | X | ○ | X | X |
| glass epoxy resin | X | X | Δ | X | X |
| aluminum | X | X | X | X | X |

TABLE 9

| Comparative Example | 1 | 2 | 3 | 4 | 5 |
|---|---|---|---|---|---|
| Physical properties after curing (curing conditions: ultraviolet irradiation (high pressure mercury lamp (100 mW/cm², 365 nm)) × 15 seconds + 23° C. 55% RH × 1 day) | | | | | |
| hardness (durometer type A) | 25 | 25 | 25 | 28 | 27 |
| elongation (%) | 120 | 120 | 130 | 130 | 120 |
| tensile strength (MPa) | 0.7 | 0.9 | 0.6 | 0.9 | 1.1 |
| Adhesiveness | | | | | |
| acrylic resin | X | X | ○ | X | X |
| glass epoxy resin | X | X | Δ | X | X |
| aluminum | X | X | X | X | X |

An organopolysiloxane composition according to the present invention has two curing mechanisms, namely photopolymerizability and condensation curability, displays superior adhesiveness and other physical properties, and in particular displays favorable adhesiveness to a substrate immediately following irradiation with ultraviolet light.

What is claimed is:

1. An organopolysiloxane composition comprising:

(A) 100 parts by weight of an organopolysiloxane represented by formula (1) shown below

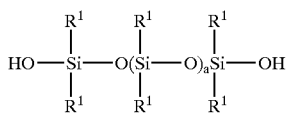

(1)

wherein, each $R^1$ represents, independently, either one of a substituted and an unsubstituted monovalent hydrocarbon group of 1 to 15 carbon atoms, and a represents an integer from 10 to 3000;

(B) 0.1 to 30 parts by weight of an organosilicon compound represented by a formula (2) shown below

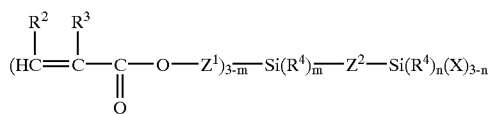

(2)

wherein, each $R^2$ represents, independently, any one of a hydrogen atom, a phenyl group and a halogenated phenyl group, each $R^3$ represents, independently, either one of a hydrogen atom and a methyl group, each $R^4$ represents, independently, either one of a substituted and an unsubstituted monovalent hydrocarbon group of 1 to 10 carbon atoms, X represents a hydrolysable group, each $Z^1$ represents, independently, any one of —$R^5$—, —$R^5$O— and —$R^5(CH_3)_2$SiO— where each $R^5$ represents, independently, either one of a substituted and an unsubstituted bivalent hydrocarbon group of 1 to 10 carbon atoms, $Z^2$ represents any one of an oxygen atom, and a substituted and an unsubstituted bivalent hydrocarbon group of 1 to 10 carbon atoms, m represents any one of 0, 1 and 2, and n represents any one of 0, 1 and 2;

(C) an effective quantity of a condensation curing catalyst; and (D) 0.01 to 10 parts by weight of a photopolymerization initiator wherein the parts by weight of the constituents (B) and (D) are based on 100 parts by weight of constituents (A).

2. An organopolysiloxane composition according to claim 1, wherein in said general formula (1), $R^1$ represents either one of a substituted and an unsubstituted monovalent hydrocarbon group of 1 to 6 carbon atoms, and a represents an integer from 50 to 1800.

3. An organopolysiloxane composition according to claim 1, wherein each $R^1$ represents, independently, any one of a halogenated alkyl group of 1 to 6 carbon atoms, an alkyl group of 1 to 6 carbon atoms, an alkenyl group of 1 to 6 carbon atoms, an aryl group of 6–10 carbon atoms, and an aralkyl group of 7–10 carbon atoms.

4. An organopolysiloxane composition according to claim 1, wherein $R^1$ represents either one of an alkyl group of 1 to 6 carbon atoms and a phenyl group.

5. An organopolysiloxane composition according to claim 1, wherein in said general formula (2), $R^4$ represents a monovalent hydrocarbon group of 1 to 3 carbon atoms.

6. An organopolysiloxane composition according to claim 1, wherein in said general formula (2), each X represents any one of an alkoxy group, an alkenyloxy group, a ketoxime group and an acyloxy group of 1 to 6 carbon atoms.

7. An organopolysiloxane composition according to claim 1, wherein in said general formula (2), each X represents either one of an alkoxy group and an alkenyloxy group of 1 to 4 carbon atoms.

8. An organopolysiloxane composition according to claim 1, wherein in said general formula (2), each $Z^1$ represents, independently, any one of —$R^5$—, —$R^5$O— and —$R^5(CH_3)_2$SiO— wherein each $R^5$ represents, independently, any one of an alkylene group, a halogen substituted alkylene group and an arylene group, and $Z^2$ represents any one of an alkylene group, a halogen substituted alkylene group and an arylene group.

9. An organopolysiloxane composition according to claim 1, wherein said condensation curing catalyst of constituent (C) is any one of an organotin compound, an organotitanium compound, an amine salt, an acid catalyst, and other basic catalysts.

10. An organopolysiloxane composition according to claim 1, wherein said hydrolysable group X of said organosilicon compound of constituent (B) is an alkenoxy group, and constituent (C) is a nitrogen containing compound with a guanidyl group.

11. An organopolysiloxane composition according to claim 1, wherein per 100 parts by weight of constituent (A), are present 1 to 20 parts by weight of constituent (B), 0.01 to 10 parts by weight of constituent (C), and 0.1 to 3 parts by weight of constituent (D).

* * * * *